No. 693,775. Patented Feb. 18, 1902.
I. BECK.
FRUIT OR VEGETABLE CUTTER.
(Application filed May 20, 1901.)
(No Model.) 2 Sheets—Sheet I.
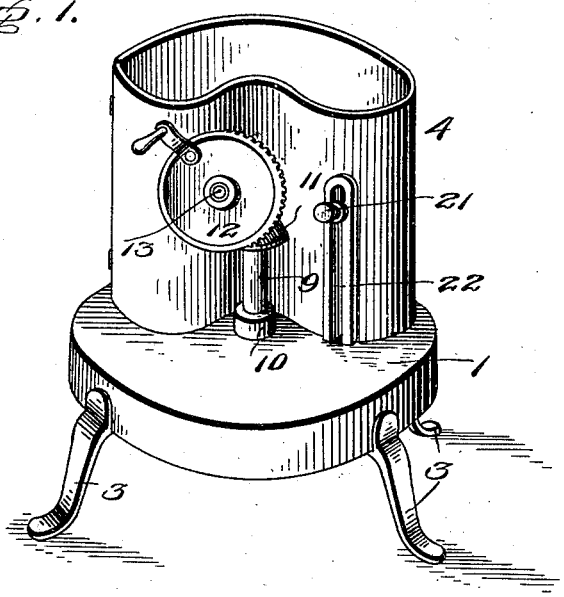
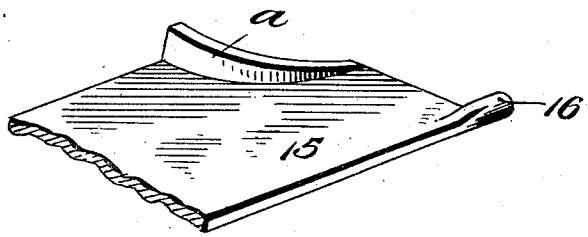
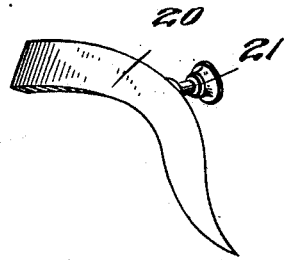
Witnesses
Inventor
Israel Beck,
By H. B. Willson &co
Attorneys No. 693,775. Patented Feb. 18, 1902.
I. BECK.
FRUIT OR VEGETABLE CUTTER.
(Application filed May 20, 1901.)

(No Model.) 2 Sheets—Sheet 2.

Witnesses
Inventor
Israel Beck,
By H. B. Willson & Co.
Attorneys

UNITED STATES PATENT OFFICE.

ISRAEL BECK, OF PHILIPSBURG, PENNSYLVANIA.

FRUIT OR VEGETABLE CUTTER.

SPECIFICATION forming part of Letters Patent No. 693,775, dated February 18, 1902.

Application filed May 20, 1901. Serial No. 61,086. (No model.)

*To all whom it may concern:*

Be it known that I, ISRAEL BECK, a citizen of the United States, residing at Philipsburg, in the county of Center and State of Pennsylvania, have invented certain new and useful Improvements in Fruit or Vegetable Cutters; and I do declare the following to be a full, clear, and exact description of the invention, such as will enable others skilled in the art to which it appertains to make and use the same.

The invention relates to fruit and vegetable cutters.

The object of the invention is to improve the construction shown in Letters Patent No. 652,740 by providing simple and positive means for adjusting and holding in locked position the throat-plates, whereby the thickness of the slices may be varied.

With this and other objects in view the invention consists of certain novel features of construction, combination, and arrangement of parts, which will be hereinafter more fully described, and particularly pointed out in the appended claim.

Figure 2:
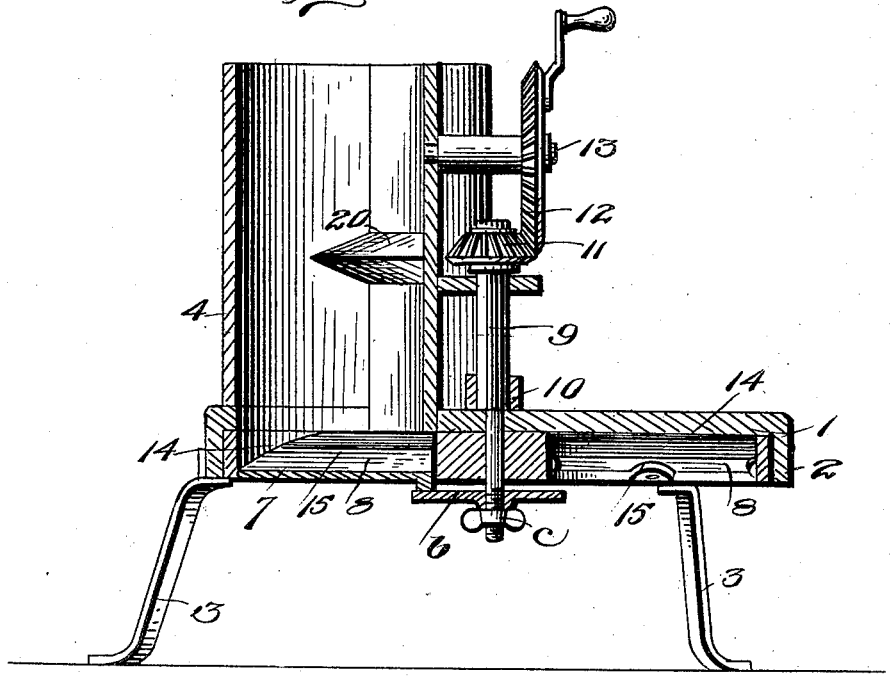
Figure 3:
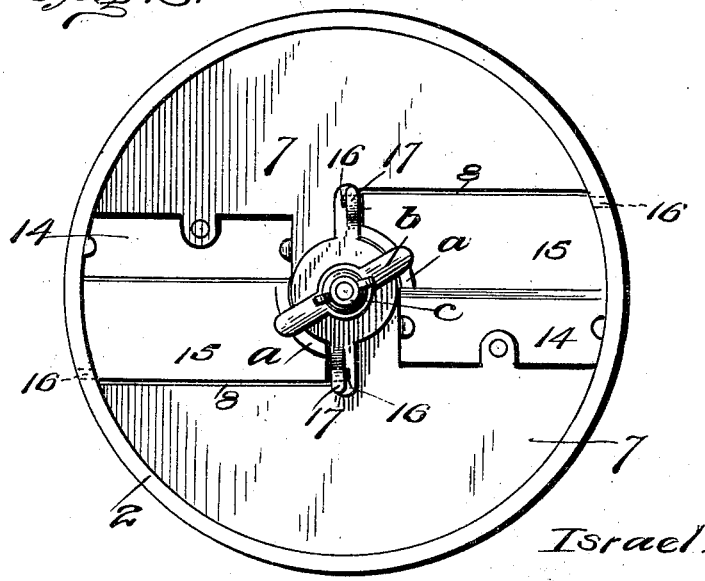

In the accompanying drawings, Figure 1 is a perspective view of my improved fruit or vegetable cutter. Fig. 2 is a central vertical sectional view. Fig. 3 is a bottom plan view of the cutter-disk and hinged throat-plates. Fig. 4 is a detail perspective view of the inner end of one of the hinged throat-plates, and Fig. 5 is a similar view of the feed-block.

In the drawings, 1 denotes the base of the machine, which is provided with downwardly-projecting flanges 2 and supporting-legs 3. 4 denotes the hopper, supported on said base 1.

7 denotes a rotary cutter-disk having radial openings 8.

9 indicates a vertical shaft, to the lower end of which the cutter-disk is secured. This shaft projects upwardly through the circular base and is journaled in bearings 10, secured to the hopper, and is provided with a beveled gear 11, which is driven by a suitable gear 12, journaled on a post 13, secured to the hopper.

14 denotes cutter-blades secured to the edges of the radial openings in the cutter-disk, and 15 denotes throat-plates having trunnions 16, journaled in bearings 17, formed in the cutter-disk. These throat-plates are made adjustable to vary the thickness of the slices, and I prefer to employ the following means for effecting this adjustment.

The inner end of each throat-plate is provided with an inclined lug $a$, and the lower end of the shaft 9 is screw-threaded and provided with a loosely-mounted swinging arm $b$, the ends of which are adapted to engage the inclined lugs. A nut $c$ screws upon the end of the shaft 9 and locks the swinging arm in its adjusted position. It is evident that by partially rotating the arm the throat-plates will be raised or lowered according to the direction of movement of said arm.

20 denotes a block V-shaped in cross-section and designed to hold the oval or round articles to be sliced, as in the patent above referred to. A set-screw 21 extends through a longitudinal slot 22 of the hopper and engages the block and enables it to be adjusted vertically to adapt the machine to cut different kinds of vegetables or fruits—that is to say, large or small.

From the foregoing description, taken in connection with the accompanying drawings, the construction, mode of operation, and advantages of my improved vegetable or fruit cutter will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

In a fruit or vegetable cutter, the combination with the main frame and a hopper mounted thereon, of a rotary cutter-disk provided with cutter-blades, throat-plates hinged to said cutter-disk and provided on their under sides with inclined lugs, and a suitably-mounted swiveled arm adapted to engage said lugs with its ends, and a nut for clamping said rotary or swinging arm in adjusted position, substantially as set forth.

In testimony whereof I have hereunto set my hand in presence of two subscribing witnesses.

ISRAEL BECK.

Witnesses:
CHAS. S. SCHOONOVER,
G. H. LICHTENTHALER.